July 24, 1934.                R. J. MINSHALL                1,967,777
                              AILERON CONTROL
                            Filed Dec. 4, 1931              2 Sheets-Sheet 2
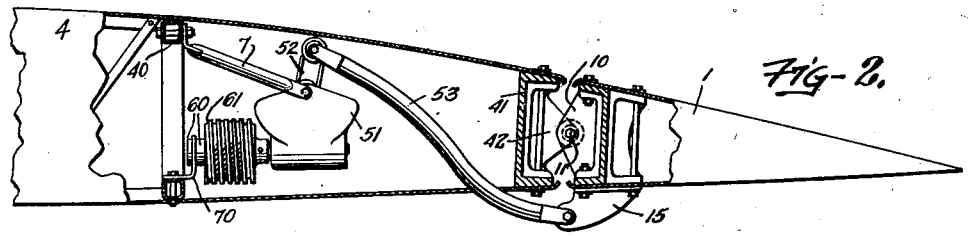
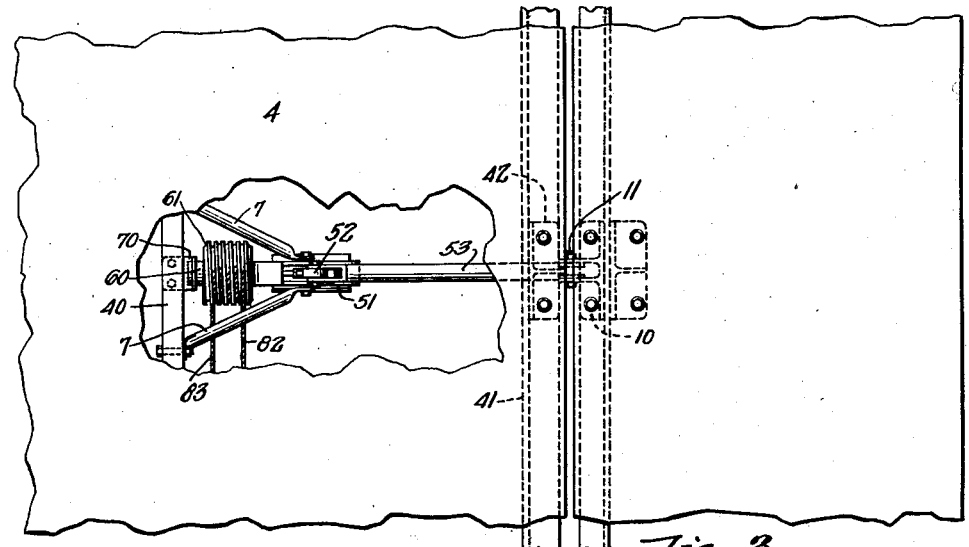
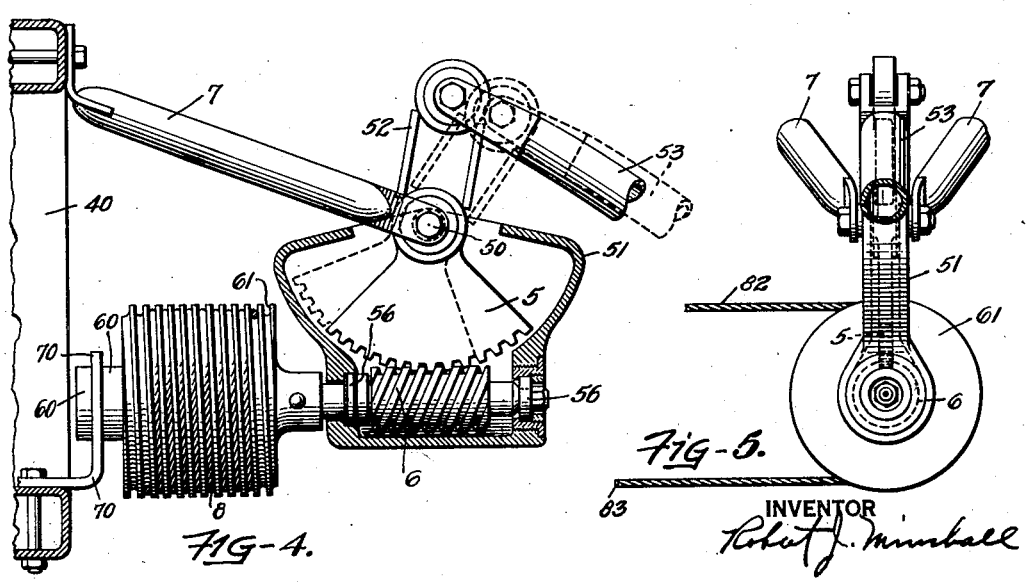
INVENTOR
Robert J. Minshall Patented July 24, 1934

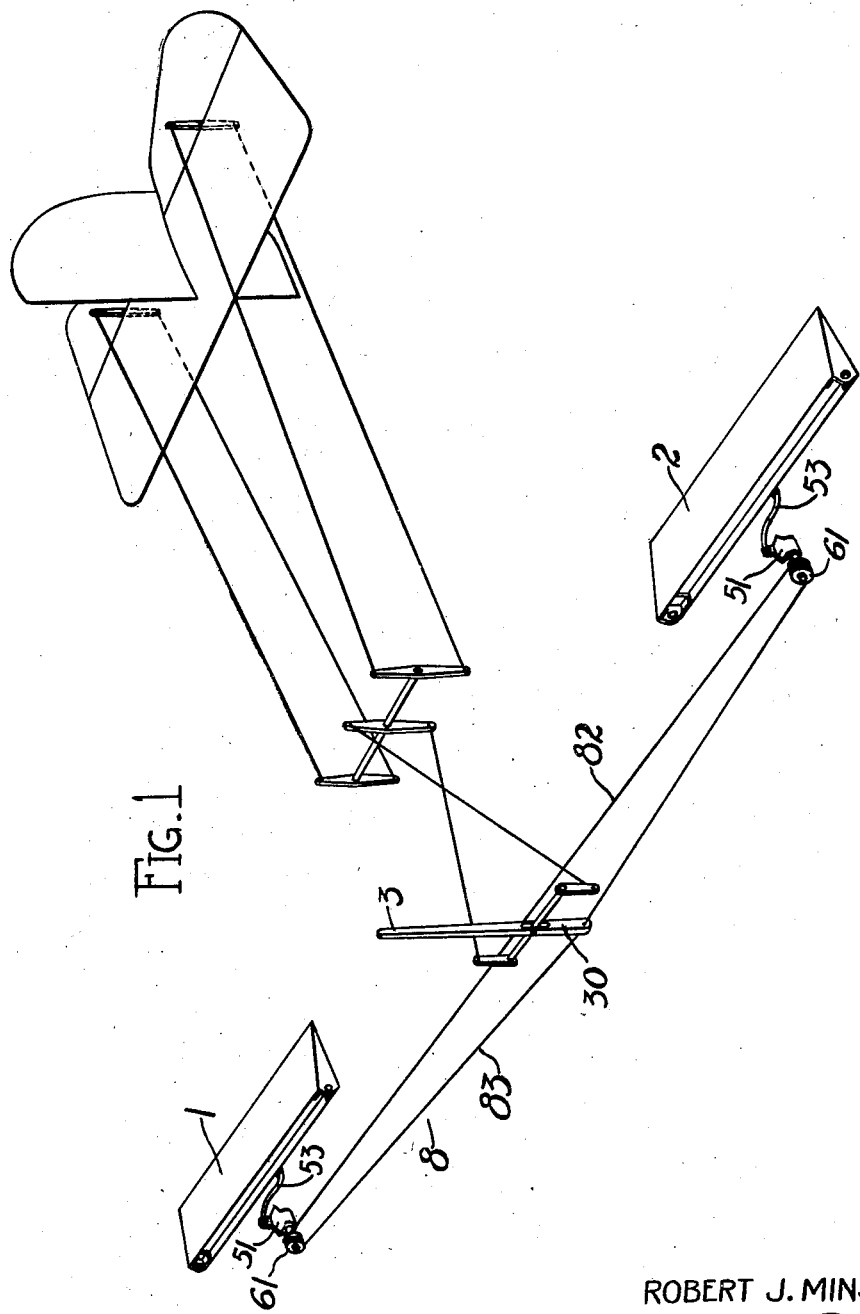

1,967,777

UNITED STATES PATENT OFFICE 1,967,777

AILERON CONTROL

Robert J. Minshall, Seattle, Wash., assignor to Boeing Airplane Company, Seattle, Wash., a corporation of Washington Refiled for abandoned application Serial No. 418,953, January 6, 1930. This application December 4, 1931, Serial No. 579,046

5 Claims. (Cl. 244—29)

The ailerons of an airplane or like craft, by means of which lateral stability is maintained or altered, may, by reason of the inherent design of the supporting plane of the ailerons or of the support of the ailerons from the wings, become a source of trouble ranging from temporary annoyance and inconvenience to the danger of complete destruction of the craft. Aileron flutter may assume such a character that it will cause the control stick to whip about so violently that the pilot is forced to relinquish it and to leave his cockpit or cabin. Analogous to the shimmy of automobile steering wheels, it may render the plane uncontrollable.

The object of my invention is to provide an aileron control system in which no "aileron flutter" will be transmitted through its actuating mechanism to the control stick in the pilot's cockpit.

It is not only an object to prevent transmission of vibrations from an aileron to the control column, but also to prevent transmission of oscillations set up in one aileron from being transmitted to the other aileron and inducing flutter in it. The aileron control means herein described prevents all disturbances of one aileron from affecting the other aileron in any way.

Another object is to provide an aileron control means which either will absorb all vibrations of the ailerons or transmit them directly to a main structural member of the airplane wing. In this way flutter of the ailerons will be dampened at its inception so that only a negligible amount will be present.

A further object is to enclose all aileron operating mechanism possible within the wing itself to minimize the wind resistance due to such mechanism, and at the same time to obviate all possible knuckle joints and sliding members, which promote looseness through wear and which require maintenance, and also to provide a mechanism requiring little actuating force.

The flutter characteristic of airfoils has been the subject of considerable research and experimentation recently, in an attempt to ascertain the cause and effect of such oscillations. Wind tunnel tests have been carried out by the Army, the Navy and the National Advisory Committee for Aeronautics on plain airfoils and also airfoils to which are attached movable control surfaces.

Three factors have been found to affect the amount and type of aileron flutter, first, the distribution of air pressure over the surface of the airfoil; second, the "angle of attack", or the angle of the airfoil chord line to the relative wind, and third, the speed of the airflow past the airfoil. Tests have shown that an airfoil of the cantilever type at small, high-speed angles of attack experiences a differential deflection of its supporting spars, or a torque is imposed upon the airfoil, of such a nature that even in perfectly smooth airflow, sustained oscillations occur which may attain perilous amplitude as the airfoil approaches the zero-lift angle of attack. Conversely, the torsional effect occurs in a lessened degree at low airspeeds and for large angles of attack. It will be seen, then, that since the modern trend in airplane design is toward high speed planes, which necessarily operate normally at low angles of attack, this problem of airfoil flutter assumes very significant proportions.

The third factor, that of pressure distribution over the airfoil, is a primary factor in affecting aileron flutter. Concentrated pressures are always more or less present on the tip portion of a wing, especially if positive tip rake is present. In this case pressures are maximum on the trailing portion of the tip which is the precise location of the aileron. The same feature is present for rectangular wing tips where the aileron has a longitudinally extended balance portion. Thus it is apparent that the ailerons are the portion of the lifting and control surfaces of a plane which are most subject to flutter in normal operation. Of course, turbulent airflow around the airfoil will tend to increase the flutter.

Wind tunnel tests carried out by the N. A. C. A. on a model tail surface are reported in N. A. C. A. report No. 285. The statement is made on page 6, the last paragraph, "On allowing one or both elevators of the tail plane to swing freely from attached hinges, very violent rolling oscillations of the tail unit developed with the precipitation of pitching oscillations of the one free elevator, or of the two separate free elevators in opposite directions—

"When the freely hinged elevators were interconnected to prevent them from pitching in opposite directions no sustained rolling oscillations of the tail unit occurred." As applied to ailerons, when freely hinged the same characteristic flutter would naturally occur, inducing rolling oscillations of the entire plane, and probably torsional oscillation in the entire wing. Furthermore, interconnection of the ailerons would aggravate this condition rather than dampen it since they are always differentially connected through the stick.

It will be seen that aileron flutter is a vital factor which must be taken into consideration in the design of an airplane, and ordinary methods of construction will not eliminate this phenomenon. I have devised a means whereby the flutter of each aileron would be prevented separately, and any stresses occurring in the aileron due to pressure distribution or the like which might otherwise induce flutter, would be transmitted directly to the rear wing spar, rather than through the control members to the opposite aileron.

Accordingly it is the purpose of the present invention to provide a control means for ailerons, so constructed and connected that the danger of development of flutter is minimized, and such that, while the ailerons are within perfect and simultaneous control of the pilot, it is impossible for an appreciable amount of flutter of one aileron or the other to occur and affect the control stick, or for stresses which would tend to cause the flutter of one aileron to be communicated to the other. Furthermore, the pilot, through this control mechanism, has the ship under control at all times without undue physical effort, and without excessive movement of the control column, and thus has the opportunity to bring the ship under control while in flight, or under such control as will permit a safe landing.

Furthermore, it is an object of the invention to provide an aileron control system which under normal conditions will afford positive and quick control of the ailerons, yet with the minimum of physical effort on the part of the pilot.

It is also an object to devise a control of the general type indicated, which is simple in construction and easy to install and maintain in operation, and one which offers the minimum of resistance, being such as can be mounted within the wing structure, and which is of minimum weight consistent with its performance.

My invention comprises the novel parts and the novel combination and arrangement thereof as a whole, as illustrated in the accompanying drawings, described in this specification, and as will be more particularly pointed out by the claims which terminate the same.

In the accompanying drawings I have shown my invention embodied in a form which at present is preferred by me.

Figure 1 is a skeleton perspective view of certain controls for an airplane, illustrating the manner of connecting the ailerons with the control stick.

Figure 2 is a fragmentary sectional end elevation of an airplane wing and aileron, showing the aileron control device associated therewith, and Figure 3 is a view in plan of the same parts.

Figure 4 is a sectional detail view of the immediate aileron operating mechanism, and Figure 5 is an end elevation of the same.

Referring first to Figure 1, the ailerons are illustrated at 1 and 2, respectively, at the right and left sides of the aircraft. The control stick 3 is or may be of any conventional form, and the manner of its connection to the elevators is immaterial insofar as the present invention is concerned.

The wing 4 is usually built upon a framework which includes a rear spar 40 and an aileron spar 41 spaced somewhat from the rear spar 40. The aileron has secured to its forward edge a bracket 10, and a corresponding bracket 42 is secured to the aileron spar, and by these or similar means the aileron is hingedly supported by the hinge member 11 from the wing. One of the causes of aileron flutter is that the hinge axis of the aileron may not so support it that it is held dynamically in equilibrium during level flight.

Supported upon a rigid member such as the wing spar 40, and adjacent each of the ailerons 1 and 2, is the immediate control device, which is inherently irreversible, and which has such characteristics that in effect it absorbs any stresses which may be induced in the aileron within itself, or transmits these stresses directly to the wing spar, and thus eliminates any flutter which might tend to occur. For instance, this local control device may comprise the worm sector 5, the worm 6 meshed therewith, and a means to transmit motion to the worm 6 and to translate the oscillation of the worm sector 5 into movement of the aileron. Thus the sector 5 may be pivoted at 50 within a casing 51, slotted at the top for the protrusion of an arm 52, to the end of which is connected a link 53 extending to a horn 15 upon the aileron. The worm 6 likewise is journaled in the casing 51, as indicated at 56.

To enable closer support of these immediate operating means, and to cut down wind resistance, I prefer that these devices be mounted between the upper and lower skin of the wing and supported directly upon the spar. To this end braces 7, connected to the spar and extending to the pivot 50, in part support this device, and the support may be completed by a bracket 70 receiving an extension 60 of the shaft of the worm 6.

Various means might be employed to rotate or oscillate the worm 6. Since this worm will cause the arm 52 to move through a considerably smaller angular distance than the worm itself moves, it is necessary, in order to obtain quick response to the control stick 3, to speed up the action of the worm 6 and to give it a considerable amount of angular movement in a short time. This may be conveniently accomplished by means of the grooved cable pulley 61 secured or formed upon the extension shaft 60, whereby it directly controls the worm 6, and connected by a cable 8 to the control stick 3.

The preferred manner of connection is illustrated in Figure 1. One run of the cable 8—for instance, the lower run 83—is connected to the lower end 30 of the control stick, and the length of this lower end governs the linear movement of the cable 8 for any given movement of the stick's upper end. The lower run 83 extends from the stick to each of the pulleys 61 at right and left sides of the plane, and from these pulleys an upper run 82 extends directly from one pulley to the other.

By such an arrangement as this, a sufficiently quick movement of the ailerons can be accomplished without more than the normal movement of the stick 3; yet because of the irreversible character of the connection achieved by the worm 6 and worm sector 5, forces acting upon the individual ailerons cannot possibly be transmitted to the cable 8. Such forces, which would ordinarily cause flutter, will tend to be absorbed in the connection between the worm and its sector, or if they are of such magnitude that they cannot be so absorbed, they will be transmitted directly by the braces 7 and brackets 70 to the supporting wing spar 40, and any appreciable vibration of the ailerons will be prevented by these members. Furthermore, if for any reason there should be a tendency in the wing structure to weave, flutter, or give, because of the rigid support of the immediate control devices upon the wing spars, and because of the irreversible character of these connections except as the pulleys 61 are rotated, there will be no tendency for relative movement between the wing and the ailerons, caused by this tendency of the wings themselves to move, and this, a common source of aileron flutter, will be eliminated.

What I claim as my invention is:

1. In aircraft, in combination with rigid wing spars, an aileron hingedly supported upon each wing, a control member disposed for operation by the pilot, irreversible means mounted upon each wing spar adjacent its respective aileron, and positively connected thereto and movable through a multiple of the amount of movement of the control member, each to locally operate its corresponding aileron independent of the other aileron, and means connecting the control member with each local operating means for simultaneous operation of the ailerons, said control member and latter means including means to compensate for the increase in amount of movement of the irreversible means relative to the control member.

2. In aircraft, in combination with two opposite wing structures each including a main spar and an aileron spar, an aileron hingedly supported each upon its respective spar, local operating means supported upon each main spar and operatively connected each to its respective aileron, said local operating means including a member directly connected to the aileron, a second member operatively connected to and movable through a multiple of the distance moved by the first, and irreversible by the first, and a third member for operation of the second in each direction, a control member disposed for operation by the pilot, and further operative connections between said control member and each of said third members for simultaneous operation of all the latter, and means associated with the control member and the operative connections to compensate for the increased movement of the second member relative to the first, and said operative connections having the characteristic of absorbing within themselves flexing movements of one wing relative to the other, without transmission to the several local operating means.

3. In an airplane, in combination with a body containing the pilot's station and oppositely directed supporting wings, each including braced wing spars, an aileron hingedly supported from each wing, a control member at the pilot's station including an actuating arm, local operating means supported directly upon the spar of each wing and operatively connected each to its respective aileron, said local operating means comprising a member directly connected to the aileron, a second member operatively connected to and movable through a multiple of the distance traveled by the first, and irreversible by the first, and pulley means of a size relative to the actuating arm to compensate for the increased movement of the second member relative to the first, connected for operation of the second in each direction, and flexible means operatively connected to said control member and extending thence to each of said pulley means for rotating the latter in each direction.

4. In combination with an airfoil including a braced spar, an aileron hingedly mounted upon said airfoil, a worm gear segment journaled upon the spar, a worm pinion meshing with and non-reversible by the gear segment, a link connecting the gear segment with the aileron outwardly of the latter's hinge axis, to swing it, and means to rotate the worm pinion in each direction at will.

5. In combination with an airfoil including a braced spar, an aileron hingedly mounted upon said airfoil, a worm gear segment journaled upon the spar, a worm pinion meshing with and non-reversible by the gear segment, a link connecting the gear segment with the aileron outwardly of the latter's hinge axis, to swing it, a cable pulley connected to rotate with the worm pinion, and a cable extending from said pulley to a distant point, for rotation in each direction at will.

ROBERT J. MINSHALL.